July 24, 1962 J. A. BERG 3,045,357
PELVIC INCLINOMETER
Filed June 2, 1958

INVENTOR.
Joseph A. Berg
BY
Mason & Graham
Attorneys.

3,045,357
PELVIC INCLINOMETER
Joseph A. Berg, Arcadia, Calif.
(619 N. Glendale Ave., Glendale 6, Calif.)
Filed June 2, 1958, Ser. No. 739,055
2 Claims. (Cl. 33—207)

This invention has to do generally with instruments for use by the medical profession.

An object of the invention is to provide a novel and improved instrument, termed a pelvic inclinometer, designed for use by physicians in determining the inclination or tilt of the pelvis of the body.

Another object is to provide an instrument of the type indicated which is easy to use and by means of which the physician or doctor can readily determine the inclination or angle of the pelvis with relation to the horizontal, and in this connection such an instrument wherein it is unnecessary to hold the instrument horizontal in a direction from end to end in order to determine the inclination of the pelvis.

A further object is to provide an instrument of the type indicated having a gauge which is suspended vertically under the influence of gravity irrespective of whether the remainder of the instrument is held horizontally and to provide an instrument wherein the gauge may be folded flat against the remainder of the instrument for compactness when not in use.

Another object is to provide a pelvic inclinometer of simple construction which can be readily and economically manufactured and marketed.

These and other objects will be apparent from the drawing and the following description. Referring to the drawing.

Figure 1:
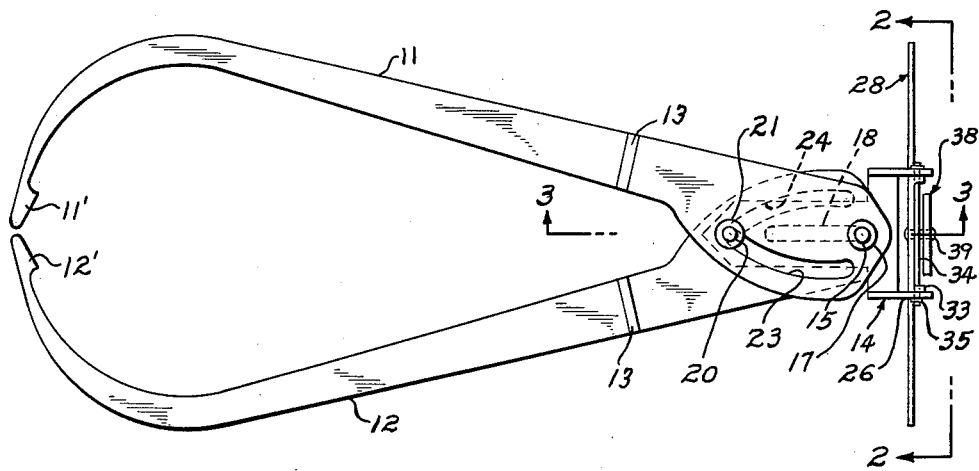
FIG. 1 is a plan view showing an instrument embodying the invention.
Figure 2:
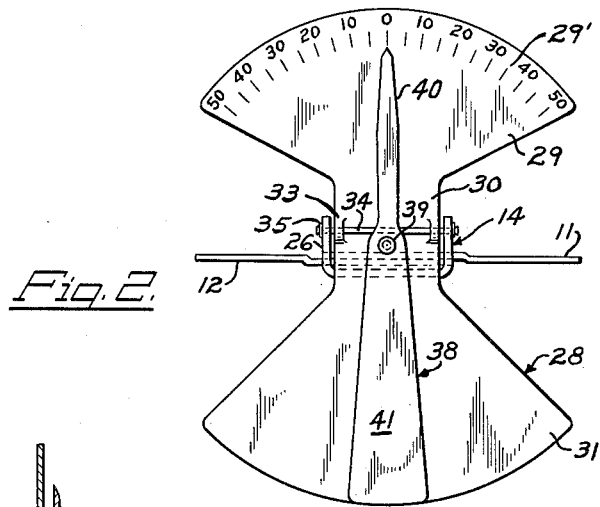
FIG. 2 is an end elevational view of the instrument of FIG. 1 taken in the direction of line 2—2 of FIG. 1.

More particularly describing the invention, the instrument comprises generally a pair of pivotally mounted arms designated 11 and 12, a bracket 14, and a gauge carried by the bracket which is generally designated by numeral 28.

Each arm is elongated and is formed with arcuate inturned end portions terminating in body-engaging tip ends 11' and 12', respectively. The arms are offset or stepped in the regions 13 so that outwardly beyond these portions the arms lie in the same plane.

The two arms are pivotally secured together by a rivet or headed pin 15 having a sleeve 17. The pin and sleeve are slidably received in a slot 18 in the plate-like body portion 19 of the bracket.

The arms are also connected for guided movement with respect to the bracket to maintain the parts oriented in a given relation by means of a rivet or headed pin 20 and a sleeve 21. The pin is fixedly mounted in the bracket 14 forwardly of the slot 18 and the pin 20 and sleeve 21 project through arcuate slots 23 and 24, respectively, in the arms. It will be apparent that when the arms are pivoted outwardly from the position in which they are shown in FIG. 1 they pivot about the axis of pin 15, but this axis moves forwardly during such movement toward the axis of the pin 20, maintaining the bracket centrally related or bisecting the arms.

The bracket 14 is formed to provide a pair of ears 26 which project upwardly and rearwardly of the main portion 19. A gauge or scale plate 28 having an upper portion 29, a central connecting portion 30 and a lower depending portion 31 is pivotally mounted on the bracket 14 between the ears 26 by means of portions 33 struck from the plate which receive a shaft 34 extending between the ears. The latter is retained by split rings 35 in grooves (not shown). The lower plate portion 31 is made larger and hence heavier than the upper portion so that the plate will hang vertically.

Mounted on the scale plate 28 is a pointer 38 which is pivoted upon a pin 39. This has a pointer upper portion 40 and a somewhat larger and heavier lower portion 41 so that it hangs in upright position. The upper portion 29 of the plate is provided with indicia 29' for cooperation with the pointer to give a sensible indication of the degree of tilt.

Figure 3:
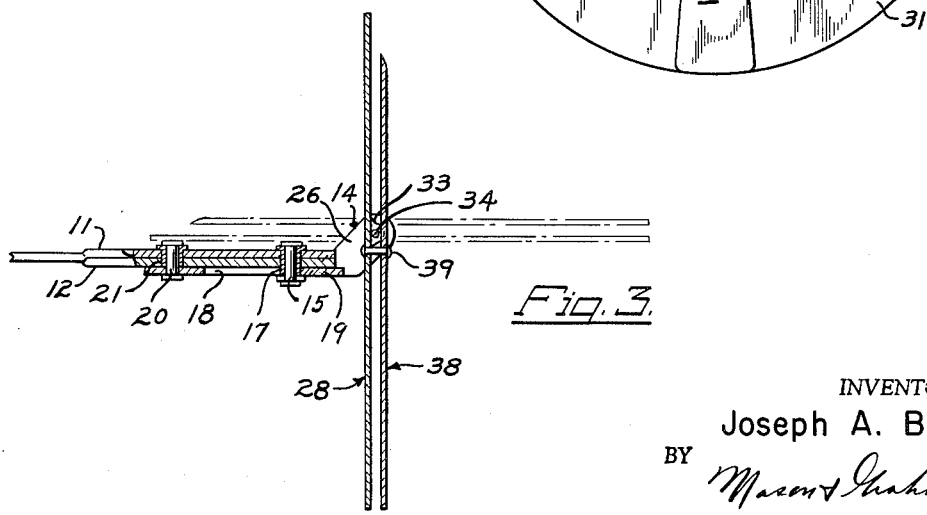
FIG. 3 is a fragmentary sectional view on line 3—3 of FIG. 1.

With the construction described it will be apparent that when the arms 11 and 12 are held horizontally, or at not too great an angle thereto, the scale plate will pivot and hang in a vertical position such as shown in the drawings. Also, the pointer 40 will hang vertically due to its enlarged and heavier lower end portion 41. Thus when the gauge is in use with the two tip ends 11', 12' of the arms 11 and 12 engaging anterior and posterior portions, respectively, of the body of a person in the region of the pelvis, the degree of tilt of the instrument about an axis passing through the pins 15 and 20 and extending generally longitudinally of the instrument will be indicated by the pointer and the indicia 29' on the scale plate. Also, it will be apparent that when not in use the scale plate 28 and its pointer may be tilted to the broken-line position of FIG. 3 to render the instrument compact.

Although I have illustrated and described a preferred form of my invention, I contemplate that various changes and modifications can be made therein without departing from the invention, the scope of which is indicated by the following claims.

I claim:

1. A pelvic inclinometer instrument, comprising a bracket, a pair of pivotally connected arms mounted on said bracket, a scale plate mounted on said bracket for limited pivotal movement about an axis normal to the pivotal axis of said arms and normal to a line bisecting the area between said arms, a pointer pivotally mounted on said plate designed to hang vertically under the influence of gravity, said scale plate having indicia positioned for use in conjunction with the pointer, and cooperating guide means on said arms and said bracket for maintaining said bracket oriented in a given angular position with reference to said arms irrespective of pivotal movement of the arms.

2. A pelvic inclinometer instrument, comprising a bracket having a flat, plate-like body and a pair of laterally spaced ears projecting upwardly and rearwardly therefrom, a pair of arms pivotally connected to each other carried on the body portion of said bracket, cooperating guide means on said arms and said bracket for maintaining said arms oriented in a given angular relation to said bracket irrespective of pivotal movement of the arms, a shaft extending between the ears of said bracket, a scale plate mounted on said shaft for pivotal movement about the axis of the shaft, said plate having an upper portion above said shaft and a lower portion below the shaft, said lower portion being heavier than said upper portion whereby said plate tends to hang vertically under the influence of gravity, and a pointer pivotally mounted on said scale plate for swinging movement about an axis normal to the plane of the scale plate and normal to the axis of said shaft, said plate having indicia thereon for use in conjunction with said pointer, said pointer being heavier below its point of pivotal support than above the same whereby the same tends to hang vertically.

(References on following page)

References Cited in the file of this patent

UNITED STATES PATENTS

| | | | |
|---|---|---|---|
| 341,378 | Gwyer | May 4, | 1886 |
| 371,294 | Woods | Oct. 11, | 1887 |
| 1,308,795 | McCormack | July 8, | 1919 |
| 1,748,454 | Morse | Feb. 25, | 1930 |
| 1,797,047 | Christoph | Mar. 17, | 1931 |
| 2,080,917 | Hochman | May 18, | 1937 |
| 2,549,244 | Schuett | Apr. 17, | 1951 |